(12) United States Patent
Washizawa et al.

(10) Patent No.: US 6,819,390 B2
(45) Date of Patent: Nov. 16, 2004

(54) LIQUID CRYSTAL DEVICE, METHOD FOR MANUFACTURING THE SAME, AND ELECTRONIC DEVICE EQUIPPED WITH THE SAME

(75) Inventors: Takehito Washizawa, Suwa (JP); Yoichi Momose, Matsumoto (JP); Yoshitomo Hirata, Toyoshina-machi (JP); Masahiro Kosuge, Suwa (JP); Emiko Onizuka, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/662,333

(22) Filed: Sep. 16, 2003

(65) Prior Publication Data

US 2004/0095545 A1 May 20, 2004

(30) Foreign Application Priority Data

Sep. 20, 2002 (JP) ........................................ 2002-275455
Sep. 20, 2002 (JP) ........................................ 2002-275456

(51) Int. Cl.$^7$ .......................................... G02F 1/1339
(52) U.S. Cl. ....................................................... 349/155
(58) Field of Search ................................... 349/155, 153, 349/187

(56) References Cited

U.S. PATENT DOCUMENTS 5,893,621 A * 4/1999 Sekiguchi .................... 349/51
6,259,500 B1 * 7/2001 Kijima et al. ................ 349/113
6,275,280 B1 * 8/2001 Kajita et al. ................. 349/155
6,504,591 B1 * 1/2003 Kondo et al. ................ 349/123
6,621,548 B2 * 9/2003 Freeman ...................... 349/155
6,757,044 B2 * 6/2004 Utsumi et al. ............... 349/155

FOREIGN PATENT DOCUMENTS

| JP | A 54-107754   | 8/1979  |
| JP | A 02-308224   | 12/1990 |
| JP | A 09-105946 2 | 4/1997  |
| JP | A 2001-188235 | 7/2001  |
| JP | A 2002-072218 | 3/2002  |

* cited by examiner

Primary Examiner—Toan Ton
(74) Attorney, Agent, or Firm—Oliff & Berridge, PLC

(57) ABSTRACT

A liquid crystal device is provided in which a pair of substrates is opposed to each other through a seal member, and a liquid crystal and spacers are contained in a space enclosed with the pair of substrates and the seal member. The spacers are placed on all or part of intersection points of a plurality of first parallel phantom lines extending in a first direction and a plurality of second parallel phantom lines extending in a second direction different from the first direction with the spacers arranged separately, in aggregation, or mixture thereof. The density of spacers is from 50 to 300/mm$^2$, and an average number of spacers on all the intersection points is from 0.2 to 3.

14 Claims, 15 Drawing Sheets

(a) UNCOLORED SPACER

WHITE DISPLAY   BLACK DISPLAY (b) COLORED SPACER

WHITE DISPLAY   BLACK DISPLAY

LIQUID CRYSTAL DEVICE, METHOD FOR MANUFACTURING THE SAME, AND ELECTRONIC DEVICE EQUIPPED WITH THE SAME

BACKGROUND OF THE INVENTION

1. Field of Invention

The present invention relates to a liquid crystal device, a method for manufacturing the same, and an electronic device equipped with the liquid crystal device. More particularly, the invention relates to a technique of placing spacers between a pair of substances.

2. Description of Related Art

Related art liquid crystal devices can be constructed such that a lower substrate and an upper substrate are bonded together with a seal member in the respective peripheries of the substrates, and a liquid crystal layer is sealed between the pair of substrates. The related art also places spacers, such as resin balls, glass balls, or columnar resin members, between the pair of substrates in order to keep the substrate spacing evenly in the substrate surfaces.

In general, such liquid crystal devices are manufactured by the following process steps of: depositing electrodes and alignment layers on each of the lower substrate and the upper substrate; printing an uncured seal member on the periphery of, for example, the lower substrate with an opening serving as a liquid crystal inlet formed therein; spraying spacers on the surface of the substrate or the other substrate; and bonding the lower substrate and the upper substrate together through a seal member, thereby forming a hollow liquid crystal cell. Then, curing the uncured seal member; injecting a liquid crystal into the liquid crystal cell through the liquid crystal inlet that is formed in the seal member in advance, by vacuum injection; sealing the inlet with a seal member; and finally, bonding an optical film, such as a retardation film or a polarizer, on the outer surfaces of the lower substrate and the upper substrate, thereby forming a liquid crystal device.

For the spacer spraying step for example, a method can be used in which spacers are evenly sprayed on the substrate by spraying a spacer dispersion liquid in which spacers are dispersed in a prescribed solvent. On the other hand, for example, a technique of arranging spacers in a specific region in a liquid crystal cell by ink jetting (droplet discharge method) is disclosed in Japanese Unexamined Patent Application Publication No. 2001-188235. The spacers act to keep the substrate spacing evenly, whereas they exert a negative influence on display, for example, they cause light leakage and misalignment of a liquid crystal when arranged in a pixel region. Therefore, liquid crystal devices in which spacers are selectively arranged only in a non-pixel region in a liquid crystal cell, and a method for manufacturing the same is disclosed in Japanese Unexamined Patent Application Publication Nos. 54-107754 and 2-308224. For example, Japanese Unexamined Patent Application Publication No. 9-105946 discloses a method of placing spacers in a non-pixel region by ink jetting. Another example is a specific spacer fixed-point placement device by ink jetting, as disclosed in Japanese Unexamined Patent Application Publication No. 2002-72218.

As described above, the related art includes methods of arranging spacers in a non-pixel region which is not involved directly in display. Although it is necessary to arrange a predetermined number of spacers or more in the liquid crystal cell in view of keeping the substrate spacing evenly, it is preferable to place a reduced or minimum number of spacers needed in consideration of a bad influence on display. From the above viewpoint, the related art techniques give no consideration to a beneficial or the optimum number (density) of spacers at all. Accordingly, a standard of a beneficial or the optimum number (density) of spacers has been required to reduce uneven display due to uneven cell thickness (substrate spacing) in the substrate surface and a decrease in contrast due to light leakage owing to the presence of spacers and misalignment and so on, thereby enhancing display quality.

It has also been required to provide a method of stably controlling the number of spacers by ink jetting. Specifically, the ink jetting only emits ink (liquid). However, in order to emit a dispersion liquid that contains a solid matter, such as a spacer, only in a fixed region, the diameter of the nozzle of the ink jet unit must be optimized. However, there has been no indicator for the most suitable nozzle diameter for the spacer dispersion liquid.

SUMMARY OF THE INVENTION

The present invention addresses the above and/or other circumstances, and provides a liquid crystal device that is superior in display quality by providing a beneficial or optimized number (density) of spacers in arranging the spacers in fixed points in a substrate surface with a droplet discharge unit, such as an ink jet unit, a method for manufacturing the liquid crystal device, and an electronic device including the liquid crystal device.

According to a first exemplary embodiment of the present invention, a liquid crystal device is provided in which a pair of substrates is opposed to each other through a seal member and a liquid crystal and spacers are contained in a sealed space enclosed with the pair of substrates and the seal member. The spacers are placed on all or part of intersection points of a plurality of first parallel phantom lines extending in a first direction and a plurality of second parallel phantom lines extending in a second direction different from the first direction with the spacers arranged separately, in aggregation, or in a mixture thereof. The density of spacers is from 50 to 300/mm$^2$ and the average number of spacers on all the intersection points is from 0.2 to 3.

According to the invention, the density of spacers is from 50 to 300/mm$^2$ and the average number of spacers on all the intersection points of the first phantom lines and the second phantom lines is from 0.2 to 3. Accordingly, deterioration in display quality due to the spacers can be sufficiently reduced so that display quality can be enhanced.

The liquid crystal device of the invention is manufactured by the below-described method such that the spacers are placed on all or part of intersection points of a plurality of first parallel phantom lines extending in a first direction and a plurality of second parallel phantom lines extending in a second direction different from the first direction with the spacers arranged separately, in aggregation, or a mixture thereof. Specifically, according to the method for manufacturing the liquid crystal device of the present invention, a spacer dispersion liquid having the spacers dispersed in a predetermined solvent is dropped on the substrate with a droplet discharge unit, and each droplet contains a random number of spacers. The solvent is evaporated after dropping, so that the spacers are left on the substrate. Since the droplet discharge unit is used, the spacers are not irregularly arranged on the substrate but are separately arranged on the intersection points of the plurality of first parallel phantom lines extending in a first direction corresponding to an arrangement direction of nozzles of the droplet discharge unit and the plurality of second parallel phantom lines extending in the second direction corresponding to a scanning direction of the nozzles of the droplet discharge unit. In the invention, the reason why the spacers are placed on all or part of the intersection points is because the number of spacers contained in the droplet is random and relatively small, so that even when droplet was dropped, it may contain no spacer, finally some points may contain no spacer.

The base for the above numerical range is described below via Examples. When the density of spacers becomes smaller than 50/mm$^2$, the substrate spacing cannot be sufficiently kept by the spacers, so that unevenness in cell thickness is increased to significantly decrease display quality. On the other hand, when the density of spacers becomes larger than 300/mm$^2$, bubbles generate in a liquid crystal at low temperature, causing a failure called vacuum bubbles. This is because, since a liquid crystal has a higher thermal expansion coefficient than that of spacers, vacuum portions occur locally in the liquid crystal layer at low temperature; however, when there are too many spacers, the substrates cannot follow to curve inward, so that the vacuum portions remain.

When the average number of spacers at all the intersection points of the first and second phantom lines is smaller than 0.2, points having no spacer increase excessively to cause variation in the arrangement of the spacers and to increase unevenness of cell thickness, so that display quality is significantly decreased. On the other hand, when the number is larger than three, spacer aggregates increase excessively to cause unevenness of cell thickness and light leakage, thus significantly decreasing display quality.

The spacers may be arranged in a non-pixel region. Specifically, the presence of spacers in display region causes mis-orientation of the liquid crystal and light leakage, thus significantly decreasing display quality. Therefore, arranging the spacers in a non-pixel region that is not involved directly in display significantly enhances display quality.

As described above, arranging the spacers in a non-pixel region enhances display quality. Furthermore, providing a light-shielding layer corresponding to the non-pixel region reduces or prevents display failure, such as light leakage more reliably.

The spacers may be colored. For example, when the liquid crystal device is used as a display, light sometimes leaks from the arranged spacers to cause white display (light display) during black display (dark display). However, coloring the spacers, as described above, particularly using black colored spacers allows black display (dark display) reliably.

The surfaces of the spacers may be subjected to a process of controlling the orientation of the liquid crystal. Specifically, irregular orientation of a liquid crystal sometimes occurs in the vicinity of the surfaces of the spacers to decrease contrast. However, providing a device to control the orientation on the surfaces of the spacers allows the orientation of the liquid crystal also on the surfaces of the spacers. This reduces or prevents occurrence of light leakage, and thus provides a liquid crystal device that seldom produces problems, such as deterioration in contrast. An example of the orientation control means includes a surface treatment that applies a long-chain alkyl group to the surface of the spacers with a silane coupling agent or the like.

The surfaces of the spacers may include a bonding layer to bond the spacers themselves onto the substrates. An example of the material for the bonding layer may include a thermosetting resin. The thermosetting resin is thus formed on the surfaces of the spacers, for example, after spacers has been arranged in certain positions between the substrates, they are subjected to heat treatment, so that the spacers can be stably fixed to the substrates, and thus the occurrence of problems such that the spacers float out of positions can be reduced or prevented.

Among the three structures of the structure in which the spacers are colored, the structure in which the surfaces of the spacers are subjected to a process of controlling the orientation of the liquid crystal, and the structure in which the surfaces of the spacers include a bonding layer for bonding the spacers themselves onto the substrate, one spacer may have one structure, two structure, or all of the three structures.

According to a second exemplary embodiment of the invention, there is provided a method for manufacturing a liquid crystal device in which a pair of substrates is opposed to each other through a seal member and a liquid crystal and spacers are contained in a sealed space enclosed with the pair of substrates and the seal member. The method includes: dropping a spacer dispersion liquid having the spacers dispersed in a predetermined solvent in certain positions on one of the pair of substrates with a droplet discharge unit; and placing the spacers by evaporating the solvent in droplets dropped on the substrate so as to arrange the spacers on all or part of the intersection points of a plurality of first parallel phantom lines extending in a first direction and a plurality of second parallel phantom lines extending in a second direction different from the first direction, with the spacers arranged separately, in aggregation, or in mixture thereof, the density of spacers being from 50 to 300/mm$^2$ and the average number of spacers on all the intersection points being from 0.2 to 3.

Specifically, after a spacer dispersion liquid having the spacers dispersed in a predetermined solvent has been dropped in certain positions on the substrate with a droplet discharge unit, the solvent in droplets is evaporated, thereby arranging the spacers in fixed points on the substrate. At that time, the density and the average number of spacers contained in one droplet are limited as described above, so that a liquid crystal device with high display quality can be provided. As described above, the first direction in which the first phantom lines extend corresponds to the direction of arrangement of the droplet discharge nozzles of the droplet discharge unit. The second direction in which the second phantom lines extend corresponds to the scanning direction of the droplet discharge nozzles of the droplet discharge unit.

The diameter of the droplet discharge nozzles of the droplet discharge unit is preferably at least 10 μm and at most 100 μm and, more preferably, at least 10 μm and at most 30 μm.

When the diameter of the droplet discharge nozzles is smaller than 10 μm, a general spacer with a diameter of about 2 to 10 μm will clog in the nozzles and a desired number of spacers in a droplet cannot be stably emitted. On the other hand, when the diameter of the nozzles is larger than 100 μm, the droplet does not become a perfect circle but a circle with a tail and adjacent droplets overlap due to excessive fluid volume, thus increasing probability that spacers are not arranged in desired positions.

The diameter of the droplet discharge nozzles is preferably at least twice as large as the diameter of the spacers. This is because if the diameter of the nozzles is smaller than twice the diameter of the spacers, the spacers may clog the nozzles or increase the variation in the number of spacers arranged in fixed points.

Also, the manufacturing method may further include the steps of forming a closed-frame-shaped seal member in the region in the surface of one of the pair of substrates; dropping the liquid crystal in the region enclosed with the seal member on the substrate having the seal member; and bonding the substrate having the seal member and the other substrate.

According to the manufacturing method, a liquid crystal is not injected by a vacuum injection method or the like after the substrates have been bonded together, but the liquid crystal is dropped on one of substrates before the substrates are bonded together and then the substrate is bonded to the other substrate. The use of the method allows not only the spacers but also the liquid crystal to receive the pressure during the bonding of the substrates, thus decreasing the number of spacers as compared with the conventional liquid crystal devices having an inlet. In other words, since the liquid crystal acts to receive part of the bonding pressure, the liquid crystal device with less spacers can bear the bonding pressure, thus keeping an even substrate spacing.

In the step of dropping the spacer dispersion liquid on the substrate, the droplet may be dropped at a spacing larger than the diameter of the droplet dropped on the substrate. The principle of arranging the spacers in fixed points by the droplet discharge method is as follows. After droplets containing spacers have been dropped in certain positions on a substrate, a solvent is evaporated. At that time, as the solvent evaporates gradually from the periphery of the droplets to decrease the center of each droplet, also the spacers gather at the center, so that the spacers are arranged in the center of the droplet. Accordingly, it is important that the droplets dropped on the substrate exist independently. Therefore, it is preferable to drop the droplets at a spacing larger than the diameter of the droplets dropped on the substrate. The reason is that if the droplets are connected together, the spacers will be positioned unstably, thus not necessarily being positioned at the center of each droplet.

An electronic device according to a third exemplary embodiment of the invention includes the above liquid crystal device. Having the liquid crystal device according to the invention allows an electronic device having a display with high display quality.

BRIEF DESCRIPTION OF THE DRAWINGS

FIG. 5A shows a state immediately after dropping, and FIG. 5B shows a state after a solvent has been evaporated;

FIG. 6A shows a state immediately after dropping, and FIG. 6B shows a state after a solvent has been evaporated;

DETAILED DESCRIPTION OF PREFERRED EMBODIMENTS

Liquid Crystal Device

An exemplary embodiment of the present invention is described below with reference to the drawings.

The following liquid crystal device is an active-matrix transmissive liquid crystal device that uses a thin film transistor (TFT) as a switching device.

Figure 1:
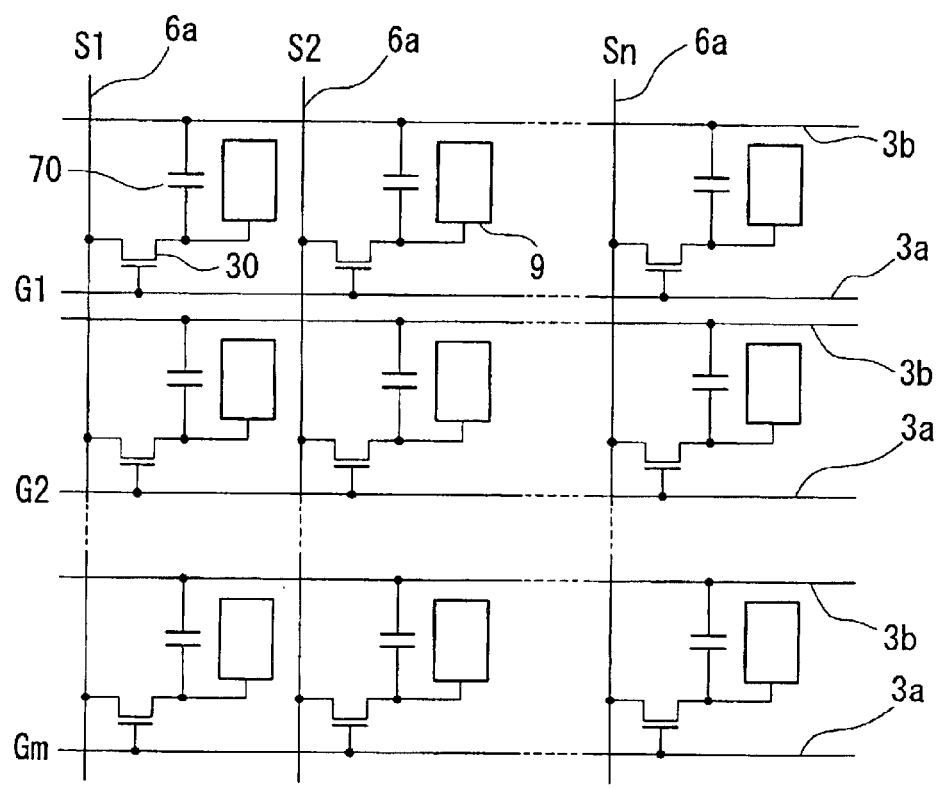
FIG. 1 is a schematic circuit diagram of switching elements and signal lines in a liquid crystal device according to an exemplary embodiment of the present invention.

FIG. 1 is a schematic circuit diagram of switching elements and signal lines in a plurality of pixels, in matrix form, of a transmissive liquid crystal device according of the exemplary embodiment.

Figure 2:
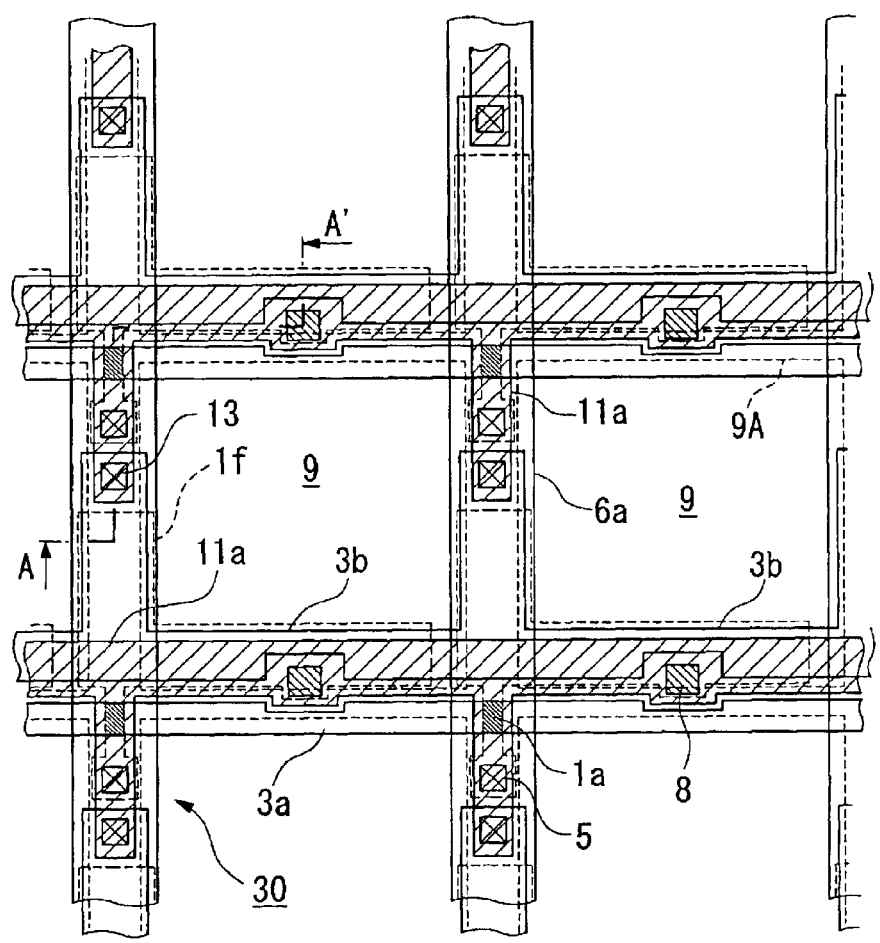
FIG. 2 is a plan view of the arrangement of a plurality of adjacent pixels on a TFT array substrate in the liquid crystal device.

FIG. 2 is a plan view of the arrangement of a significant part of a plurality of adjacent pixels on a TFT array substrate having data lines, scanning lines, pixel electrodes, and so on.

Figure 3:
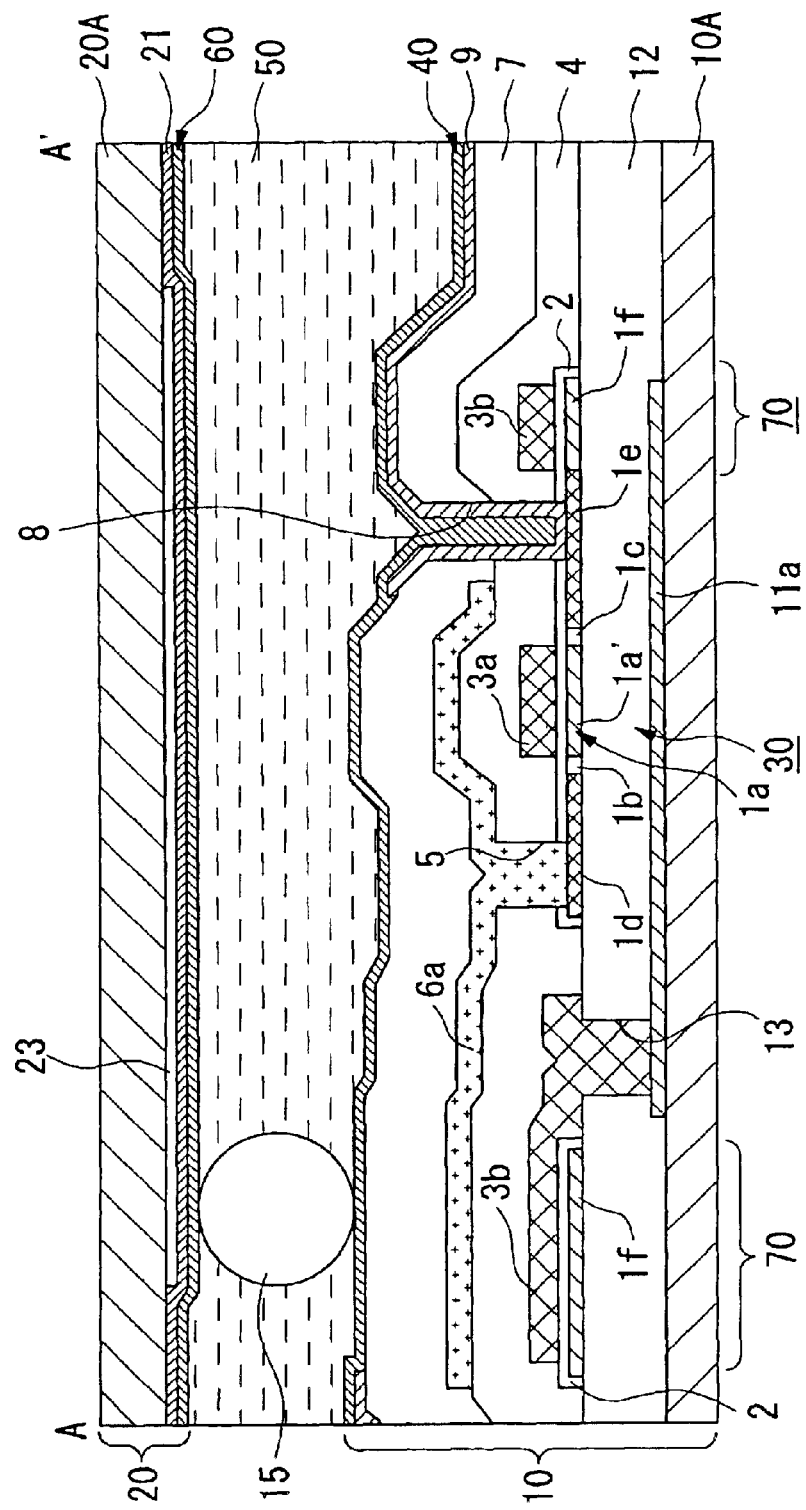
FIG. 3 is a sectional view of the arrangement of a non-pixel region of the liquid crystal panel.
Figure 4:
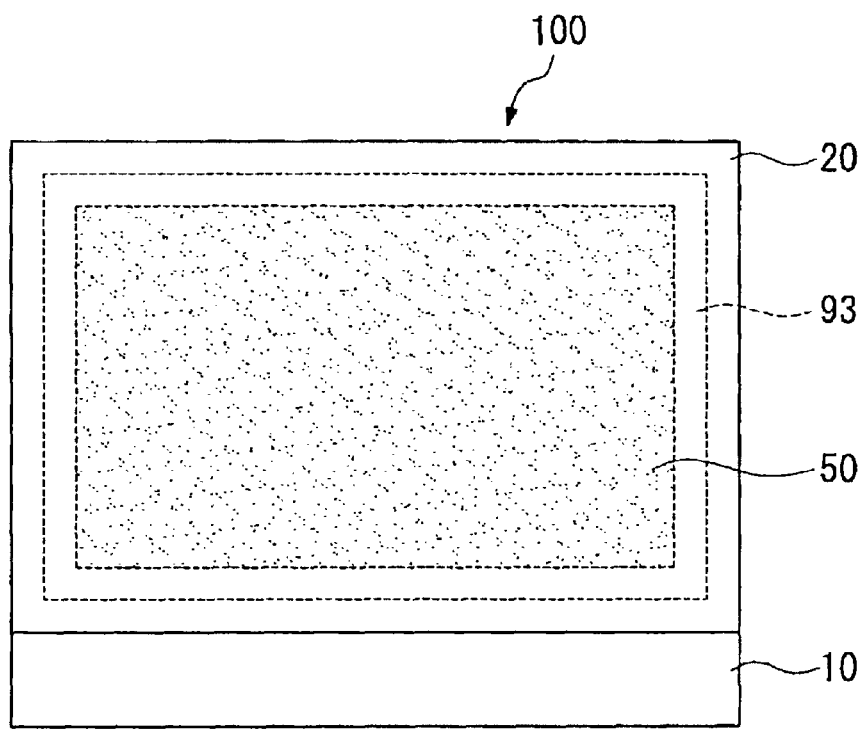
FIG. 4 is a schematic plan view of the outline of the overall layout of the liquid crystal device.

FIG. 3 is a sectional view of the arrangement taken along plane A-A' in FIG. 2; and FIG. 4 is a plan view of the planar structure of the entire transmissive liquid crystal device of the exemplary embodiment.

FIG. 3 shows a case with the upper part of the drawing as a light incidence side and the lower part as a viewing side (observer's side). Each of the drawings shows the layers and the components with different scales in order to make them more recognizable in the drawing.

As FIG. 1 shows, in the liquid crystal device of the exemplary embodiment, the plurality of pixels arranged in matrix form each include a pixel electrode 9 and a TFT element 30 acting as a switching element to control energization to the pixel electrode 9. A data line 6a to which image signals are supplied is electrically connected to the source of the TFT element 30. Image signals S1, S2 through Sn to be written to the data line 6a are sequentially supplied in this order or, alternatively, supplied to the adjacent data lines 6a for each group.

A scanning line 3a is electrically connected to the gate of the TFT element 30. Scanning signals G1, G2 through Gn are applied to a plurality of the scanning lines 3a with pulses in line sequence at a given timing. The pixel electrode 9 is electrically connected to the drain of the TFT element 30, wherein the TFT element 30 serving as a switching element is stayed on for a fixed period of time, so that the image signals S1, S2 through Sn that are supplied from the data line 6a are written at a given timing.

The image signals S1, S2 through Sn with a predetermined level, which are written to the liquid crystal through the pixel electrode 9, are held between it and a common electrode (described later) for a fixed period of time. The liquid crystal changes in the orientation and order of molecular association depending on the applied voltage level to modulate light, thereby allowing gray-scale display. In order to reduce or prevent leakage of the held image signals, a storage capacitor 70 is added in parallel with a liquid crystal capacitor that is formed between the pixel electrode 9 and the common electrode.

Referring to FIG. 2, the planar structure of the essential part of the liquid crystal device of the exemplary embodiment is described below. As FIG. 2 shows, a plurality of the rectangular pixel electrodes 9 (the outline is indicated by dotted line 9A) is provided in matrix form on the TFT array substrate 30, the pixel electrode 9 being made of a transparent conductive material such as indium tin oxide (hereinafter, abbreviated to ITO). The data line 6a, the scanning line 3a, and a capacitor line 3b are disposed along the vertical and horizontal boundaries of the pixel electrode 9. In this exemplary embodiment, the region including the pixel electrode 9, and the data line 6a, the scanning line 3a, and the capacitor line 3b that are arranged to surround the pixel electrode 9 is a pixel, so that the exemplary embodiment is allowed to display for each pixel in matrix form.

The data line 6a constructs the TFT element 30. For example, the data line 6a is electrically connected to a source region (described below) of a semiconductor layer 1a, for example, made of a polysilicon film, through a contact hole 5. The pixel electrode 9 is electrically connected to a drain region (described below) of the semiconductor layer 1a through a contact hole 8. The scanning line 3a is arranged to face a channel region (indicated by leftward diagonal lines in the drawing) of the semiconductor layer 1a. The scanning line 3a acts as a gate electrode at a portion opposed to the channel region.

The capacitor line 3b includes a main line (a first region along the scanning line 3a, in plan view) extending substantially linearly along the scanning line 3a and a projecting part (a second region extending along the data line 6a, in plan view) projecting from a portion crossing the data line 6a toward a pre-stage (upward in the drawing) along the data line 6a. The region indicated by a rightward diagonally lines in FIG. 2 includes a plurality of first light-shielding films 11a.

Referring next to FIG. 3, the sectional structure of the liquid crystal device of the exemplary embodiment is described below. As described above, FIG. 3 is a cross-sectional view taken along plane A-A' in FIG. 2, showing the arrangement of the region including the TFT element 30. The liquid crystal device of the exemplary embodiment includes a liquid crystal layer 50 between a TFT array substrate 10 and an opposed substrate 20 opposed thereto.

The liquid crystal layer 50 is formed of a smectic liquid crystal that is a ferroelectric liquid crystal and has a high responsiveness of liquid crystal drive to voltage change. The TFT array substrate 10 includes a substrate body 10A made of a translucent material, such as quartz, and the TFT element 30, the scanning line 3a, the capacitor line 3b, the data line 6a, the pixel electrode 9, and an alignment layer 40 which are formed on the surface of the 10A adjacent to the liquid crystal layer 50. The opposed substrate 20 is formed of a substrate body 20A made of a translucent material such as glass and quarts, and a common electrode 21 and an alignment layer 60 formed on the surface of the substrate body 20A adjacent to the liquid crystal layer 50. The substrates 10 and 20 keep a predetermined space therebetween through a spacer 15. FIG. 3 shows the spacer 15 that exists separately above the data line 6a. In this manner, the exemplary embodiment has the spacer 15 in a non-pixel region. The "non-pixel region" denotes a region that includes wires, such as the data line 6a, the scanning line 3a, and the capacitor line 3b and the TFT element 30 and is not involved in display substantially.

The TFT array substrate 10 has the pixel electrodes 9 on the surface of the substrate body 10A adjacent to the liquid crystal layer 50 and has the pixel-switching TFT elements 30 at positions adjacent to the pixel electrodes 9 to control the switching of the pixel electrodes 9. The each TFT element 30 has a lightly doped drain (LDD) structure and includes a scanning line 3a, a channel region 1a' of the semiconductor layer 1a in which a channel is formed by the electric field from the scanning line 3a, a gate insulating film 2 to insulate the scanning line 3a from the semiconductor layer 1a, the data line 6a, a lightly doped source region b and a lightly doped drain region 1c of the semiconductor layer 1a, and a heavily doped source region 1d and a heavily doped source region 1e of the semiconductor layer 1a.

A second layer-insulating film 4 having the contact hole 5 that communicates with the heavily doped source region 1d and the contact hole 8 that communicates with the heavily doped source region 1e is formed above the substrate body 10A including the area on the scanning line 3a and the gate insulating film 2. In other words, the data line 6a is electrically connected to the heavily doped source region 1d through the contact hole 5 that passes thorough the second layer-insulating film 4.

A third layer-insulating film 7 having the contact hole 8 that communicates with the heavily doped source region 1e is formed on the data line 6a and the second layer-insulating film 4,. In other words, the heavily doped source region 1e is electrically connected to the pixel electrode 9 through the contact hole 8 that passes through the second layer-insulating film 4 and the third layer-insulating film 7.

In this exemplary embodiment, a storage capacitor 70 is constructed such that the gate insulating film 2 extending from the position opposed to the scanning line 3a is used as a dielectric film; the semiconductor layer 1a is extended to form a first storage capacitor electrode 1f; and a part of the capacitor line 3b opposed thereto is used as a second storage capacitor electrode.

The region that has the pixel-switching TFT elements 30 on the surface of the substrate body 10A of the TFT array substrate 10 adjacent to the liquid crystal layer 50 includes the first light-shielding film 11a to reduce or prevent light that passes through the TFT array substrate 10 and is reflected by the lower surface of the TFT array substrate 10, viewed in the drawing, (the interface between the TFT array substrate 10 and air) to return to the liquid crystal layer 50 from entering at least the channel region 1a' of the semiconductor layer 1a, the lightly doped source regions 1b and 1c.

Also, a first layer-insulating film 12 is formed between the first light-shielding film 11a and the pixel-switching TFT element 30, to electrically insulate the semiconductor layer 1a that forms the pixel-switching TFT element 30 from the first light-shielding film 11a. As FIG. 2 shows, in addition to the first light-shielding film 11a on the TFT array substrate 10, the first light-shielding film 11a is electrically connected to the pre-stage or next-stage capacitor line 3b through a contact hole 13.

Furthermore, an alignment layer 40 is formed on the outermost surface of the TFT array substrate 10 adjacent to the liquid crystal layer 50, that is, on the pixel electrode 9 and the third layer-insulating film 7, to control the orientation of liquid crystal molecules in the liquid crystal layer 50 during a no-voltage-applied state. Accordingly, in the region having such the TFT element 30, the outermost surface of the TFT array substrate 10 adjacent to the liquid crystal layer 50, that is, a surface that holds the liquid crystal layer 50 has a plurality of projections and recesses, or steps.

On the other hand, the opposed substrate 20 has a second light-shielding film 23 on the surface of the substrate body 20A adjacent to the liquid crystal layer 50 and in the region facing the region having the data line 6a, the scanning line 3a, and the TFT element 30, that is, in the region other than the opening region of each pixel, to reduce or prevent incident light from entering the channel region 1a' of the semiconductor layer 1a and the lightly doped source regions 1b and 1c of the pixel-switching TFT element 30. Furthermore, the substantially whole surface of the substrate body 20A adjacent to the liquid crystal layer 50, which has the second light-shielding film 23, has a common electrode 21 made of ITO or the like, and an alignment layer 60 is formed on the surface adjacent to the liquid crystal layer 50, to control the orientation of liquid crystal molecules in the liquid crystal layer 50 during a no-voltage-applied state.

FIG. 4 is a schematic plan view of an example of the overall layout of a liquid crystal device 100 according to the exemplary embodiment. The liquid crystal layer 50 is formed between the TFT array substrate 10 and the opposed substrate 20 such that it is sealed with a closed-ring-shaped seal member 93. Specifically, the seal member 93 of the liquid crystal device 100 according to the exemplary embodiment has no inlet for a liquid crystal and has a closed rectangular shape in the plane of the substrates 10 and 20. The seal member 93 is not exposed to the outer rims of the substrates 10 and 20 and has a closed frame shape having no opening opened to the outer rims of the substrates 10 and 20.

In the exemplary embodiment, as described above, the non-pixel region between the pair of substrates 10 and 20 that sandwich the liquid crystal layer 50 therebetween has the spacers 15, and the inside of the seal member 93 of FIG. 4 has the spacers 15 with a density of 50 to 300/mm and an average of 0.2 to 3 each point where the spacer 15 exists separately or in aggregation.

Figure 5A:
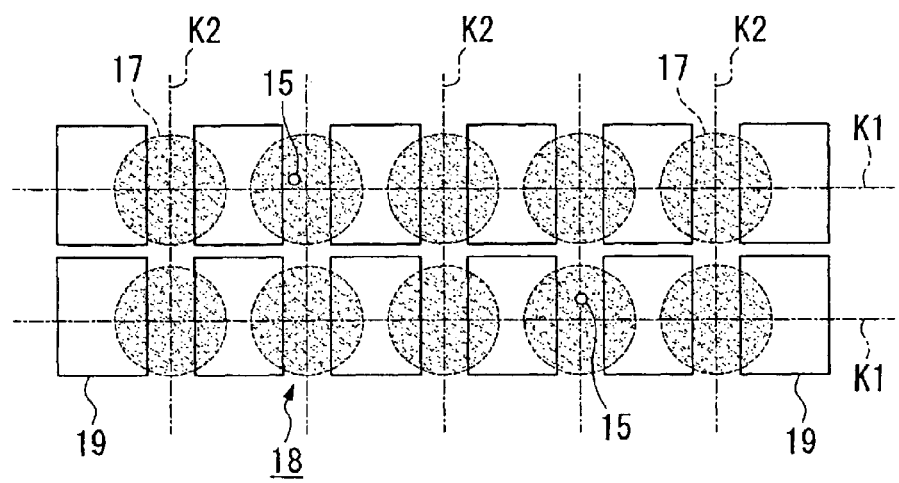
FIGS. 5A and 5B are plan views of an example of a state in which an average of 0.2 spacers exist per droplet in the process of arranging spacers in the liquid crystal device, where
Figure 5B:
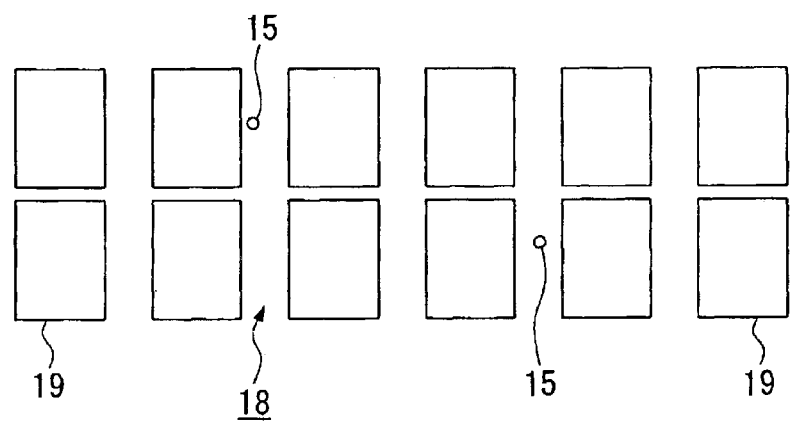
Figure 6A:
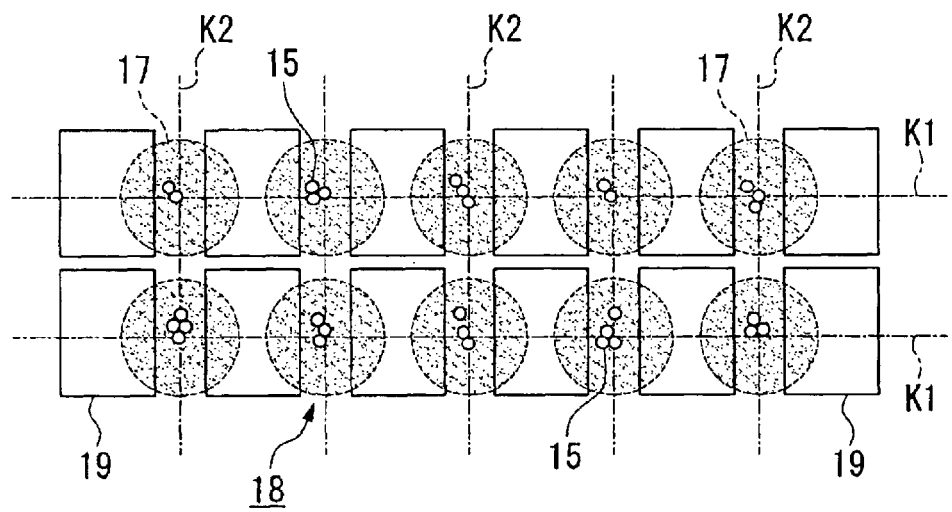
FIGS. 6A and 6B are plan views of an example of a state in which an average of three spacers exist per droplet in the process of placing spacers in the liquid crystal device, where
Figure 6B:
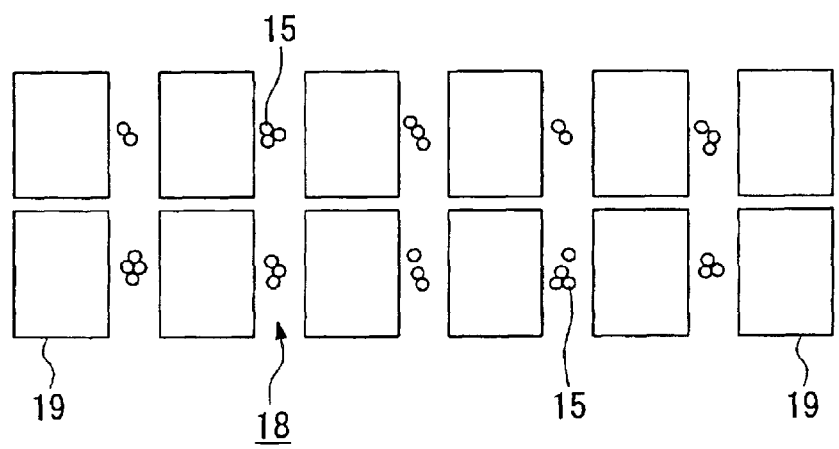

FIGS. 5A–6B show the arrangement of the spacers 15 in the substrate surface. FIGS. 5A and 5B show an image in which an average of 0.2 spacers exists per droplet, and FIGS. 6A and 6A show an image in which an average of three spacers exist per droplet. FIGS. 5A and 6A show a state immediately after dropping, and FIGS. 5B and 6B show a state after a solvent has been evaporated. A circle 17 with shading indicates a droplet dropped on the substrate and a circle 15 indicates a spacer.

As shown in the drawings, since the spacers 15 are arranged with a droplet discharge unit (described below), they are not irregularly arranged at all. They are separately arranged in the vicinity of the intersection points of a plurality of first parallel phantom lines K1 that extends at least in one direction and a plurality of second parallel phantom lines K2 that extends in the direction perpendicular to the first phantom lines K1 in a non-pixel region 18 outside a pixel region 19. The first phantom lines K1 indicate the direction of the arrangement of a plurality of droplet discharge nozzles of the droplet discharge unit. The second phantom lines K2 indicate the scanning direction of the plurality of droplet discharge nozzles. In this exemplary embodiment, the first phantom lines K1 and the second phantom lines K2 cross at right angles. However, the phantom lines may not necessarily cross at right angled. In other words, the direction of arrangement and the scanning direction of the droplet discharge nozzles of the droplet discharge unit may form angles other than the right angles.

As clearly shown in FIGS. 5A and 5B, the fact that an average of 0.2 spacers exist for each droplet 17 indicates that among any ten droplets, there are two droplets that contain one spacer and remaining eight droplets have no spacer. Also clearly shown in FIGS. 6A and 6B, the number of the spacers 15 contained in each droplet 17 cannot be controlled. For example, an average of three droplets does not indicate that all the droplets have three spacers 15 each. The spacers 15 in one droplet exist separately or in aggregation or in mixture thereof.

In the liquid crystal device according to the exemplary embodiment, since the arrangement of the spacers 15 is enhanced or optimized to set the density from 50 to 300/mm$^2$ and to set the average number of spacers 15 per droplet from 0.2 to 3, problems, such as light leakage and a decrease in contrast due to the spacers 15, can be sufficiently reduced, so that display quality can be enhanced.

Figure 7:
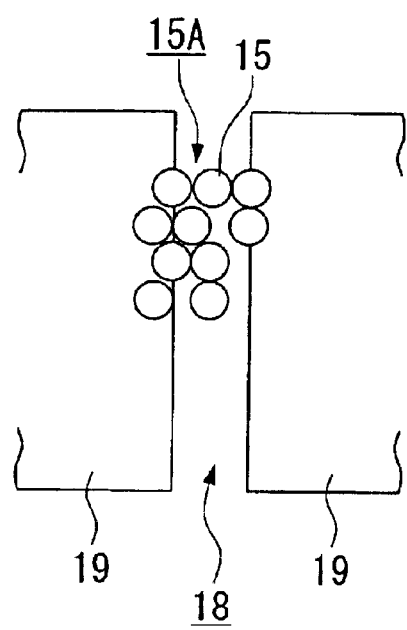
FIG. 7 is a plan view of a state in which a spacer aggregate is formed in the process of placing spacers in the liquid crystal device.

For example, when the density of the spacers 15 becomes lower than 50/mm$^2$, the distance between the substrates cannot be sufficiently held by the spacers 15 to increase the unevenness in cell thickness, thereby significantly decreasing display quality. On the other hand, when the density of the spacers 15 becomes higher than 300/mm$^2$, a problem called a vacuum bubble occurs at low temperature. When the average number of spacers 15 for one droplet is smaller than 0.2, a droplet having no spacer 15 increases excessively to cause variation in the arrangement of the spacers 15 and thus increases the unevenness in the cell thickness, which significantly decreases display quality. Contrarily, when the average number for one droplet is larger than three, the spacers 15 in the form of aggregate increase excessively, as shown in FIG. 7, and a large spacer aggregate 15A sometimes extends off the non-pixel region 18 into the pixel region 19. This not only causes unevenness in cell thickness but also increases light leakage and mis-orientation to significantly reduce display quality.

Although the exemplary embodiment has a structure based on achromatic display, it may include a color filter layer for color display. Specifically, it is also possible to dispose a color filter layer having a color layer and a light-shielding layer (black matrix) inside the upper substrate (opposed substrate) 20, and to form a protective layer in sequence to protect the color filter layer, and then to form the common electrode 21 on the protective layer. The display region has different color layers such as red (R), green (G), and blue (B). Therefore, the color display regions form respective pixels to allow color display for each pixel. Although the exemplary embodiment takes the active matrix liquid crystal device as an example, the invention may also be applied to, for example, a passive matrix liquid crystal device.

The structure of the spacers 15 used in the liquid crystal device of the exemplary embodiment is described below. Each spacer 15 may be formed of a spherical member made of silicon dioxide, polyethylene, or the like. The diameter of the spacer 15 is set in agreement with the thickness (cell thickness, or substrate spacing) of the liquid crystal layer 50 to be sealed in the liquid crystal device, for example, within the range from 2 to 10 μm.

Figure 8:
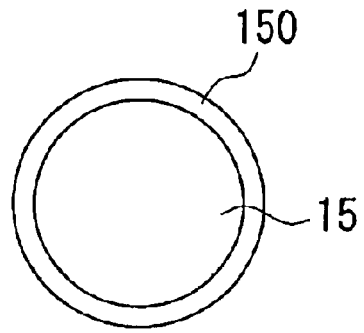
FIG. 8 is a schematic of the arrangement of spacers.

As FIG. 8 shows, the spacer 15 may be one having a thermosetting resin layer 150 thereon. In this case, the thermosetting resin is cured so that the spacer 15 is firmly secured to the lower substrate (TFT array substrate) 10 and the upper substrate (opposed substrate) 20. For example, in the process of manufacturing the liquid crystal device, after the spacers 15 are sprayed on a substrate (opposed substrate 20) different from a substrate (for example, the TFT array substrate 10) on which liquid crystal is dropped, it is subjected to heat treatment so that the thermosetting resin is cured. Thus, the spacers 15 can be fixed to the opposed substrate 20.

Figure 9:
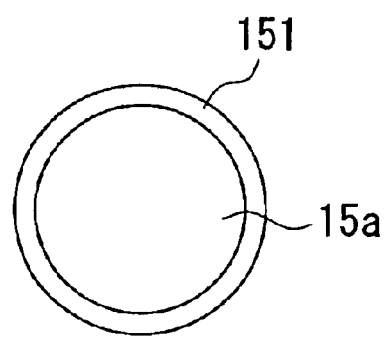
FIG. 9 is a schematic of an arrangement when a spacer is given a surface treatment layer.
Figure 11A:
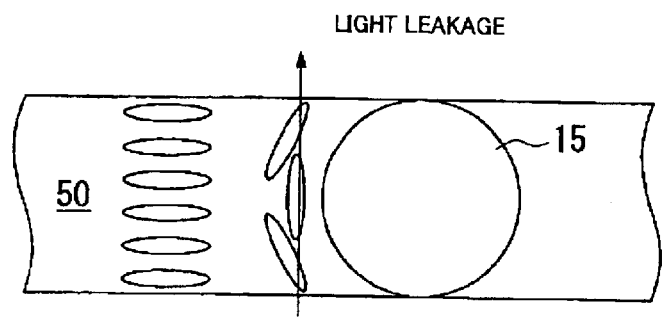
FIGS. 11A and 11B are schematics showing the effects of using the spacer of FIG. 9.
Figure 11B:
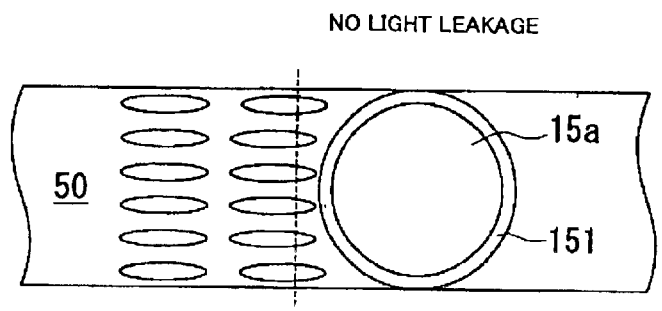

As FIG. 9 shows, the spacer 15 may have a surface treated layer 151 that is given a long-chain alkyl group thereon. A surface treatment with a silane coupling agent can be used to provide the surface treated layer 151 having the long-chain alkyl group. As FIG. 11A shows, the use of the spacer 15 having no surface treated layer 151 may cause misorientation of liquid crystal molecules in the vicinity of the surface of the spacer 15, which may cause light leakage there. On the other hand, the use of a spacer 15a having the surface treated layer 151 allows liquid crystal molecules to be oriented in a predetermined direction (vertically in this exemplary embodiment) in the vicinity of the surface of the spacer 15a, thus causing less light leakage there.

Figure 10:
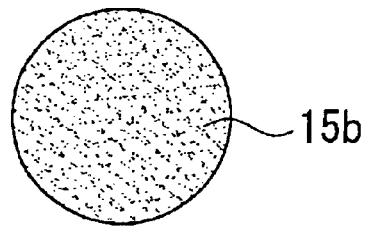
FIG. 10 is a schematic of an arrangement when a spacer is colored.
Figure 12A:
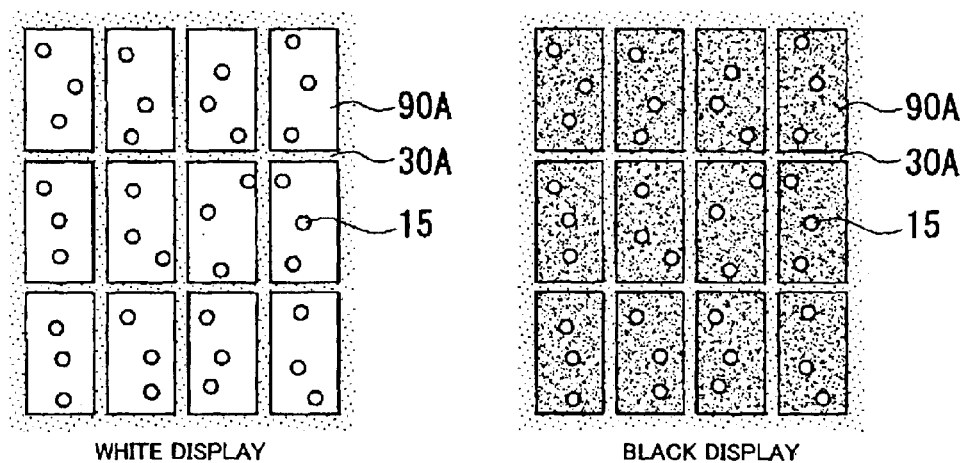
FIGS. 12A and 12B are schematics showing the effects of using the spacer of FIG. 10.
Figure 12B:
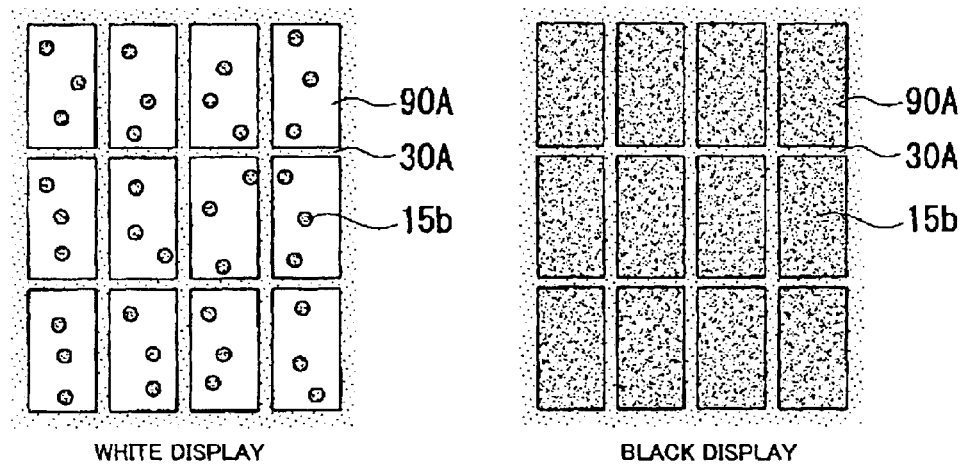

The spacer may be colored. A spacer 15b in FIG. 10 is an example of a black colored spacer. For example, as FIG. 12A shows, the use of the uncolored spacer 15 will generate luminous dot display corresponding to the spacer during black display (dark display), which may sometimes cause a decrease in contrast. On the other hand, as FIG. 12B shows, the use of the colored spacer 15b of FIG. 10 generates no luminous dot display corresponding to the spacer during black display (dark display). During white display (light display), dark dot display corresponding to the spacer may occur. However, the effect on a decrease in contrast is lower than that of the generation of luminous dot display during black display (dark display).

Method for Manufacturing Liquid Crystal Display

A method for manufacturing the liquid crystal display according to the exemplary embodiment is described below with reference to FIGS. 3 and 13 to 17.

Figure 13:
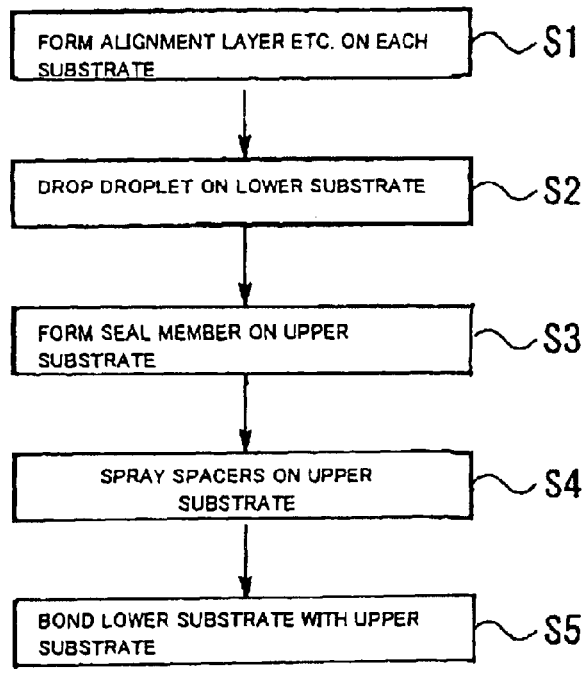
FIG. 13 is a flowchart of an example of a method for manufacturing a liquid crystal device.

As shown in step S1 of FIG. 13, the light-shielding film 11a; the first layer-insulating film 12, the semiconductor layer 1a, the channel region 1a', the lightly doped source region 1b, the lightly doped drain region 1c, the heavily doped source region 1d, the heavily doped source region 1e, the storage capacitor electrode 1f, the scanning line 3a, the capacitor line 3b, the second layer-insulating film 4, the data line 6a, the third layer-insulating film 7, the contact hole 8, the pixel electrode 9, and the alignment layer 40 are formed on the lower substrate body 10A made of glass or the like to form the lower substrate (TFT array substrate) 10. Also on the upper substrate body 20A, the light-shielding film 23, the opposed common electrode 21, and the alignment layer 60 are formed to form the upper substrate (opposed substrate) 20.

In step S2 of FIG. 13, a predetermined amount of liquid crystal corresponding to the cell thickness of the liquid crystal device is dropped on the lower substrate (TFT array substrate) 10. Subsequently, in step S3 of FIG. 13, the seal member 93 is printed on the upper substrate 20 and, in step S4, the spacers 15 are arranged on the upper substrate 20 with an ink-jet unit. In this case, the seal member 93 is formed in a closed frame shape having no liquid crystal inlet, as shown in FIG. 4. As described above, the density of the spacers 15 in a spacer dispersion liquid to be prepared in the ink-jet unit is controlled so that there are the spacers 15 with a density of 50 to 300/mm$^2$ and an average of 0.2 to 3 per droplet.

Figure 15A:
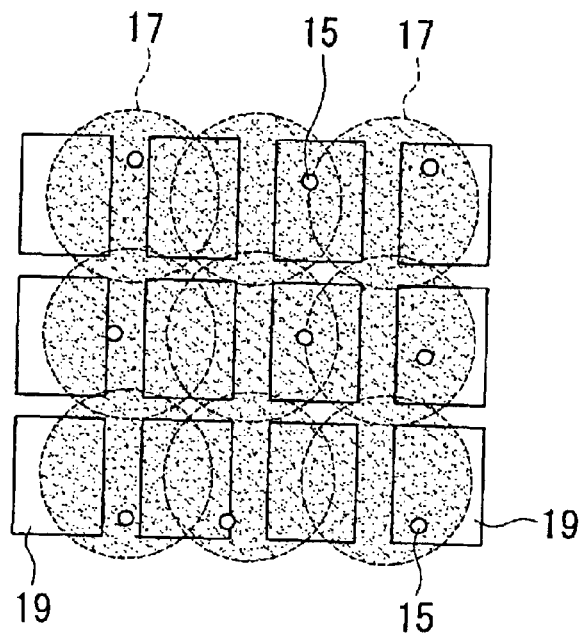
FIGS. 15A and 15B are schematics of a state in which droplets are dropped with a spacing smaller than the diameter of each droplet in the process of placing spacers.
Figure 15B:
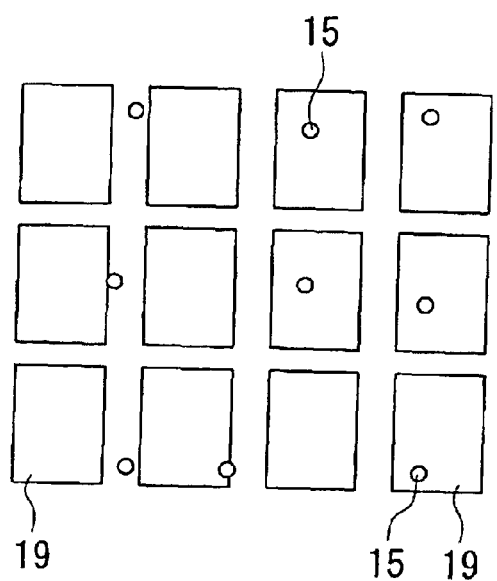

The conditions for the ink-jet unit must be set so as to drop the droplets 17 at a spacing larger than the diameter of the droplet 17 which expands on the upper substrate 20 when dropped thereon. The spacers 15 can be arranged in fixed points by the ink-jet method in such a way that the droplets 17 containing the spacers 15 are dropped properly in certain positions on the substrate from the head of the ink-jet unit and, the solvent is evaporated gradually from the periphery of the droplets 17 after the droplets 17 have been dropped to decrease the center of the droplet 17 in size, so that the spacers 15 are concentrated to the center, and thus the spacers 15 are arranged near the center of the droplet 17. Accordingly, it is important that the droplets 17 dropped on the substrate are separated from one another. Therefore, it is desirable to drop the droplets 17 with a spacing larger than the diameter of each droplet 17 when dropped on the substrate. If the droplets 17 are dropped with a spacing smaller than the diameter of the droplets 17 so that adjacent droplets 17 are connected with one another, as shown in FIG. 15A, each of the spacers 15 is not always positioned at the center of the droplet 17 when the solvent has been evaporated, so that some spacers 15 may be arranged in the pixel region 19, as shown in FIG. 15B.

Figure 16:
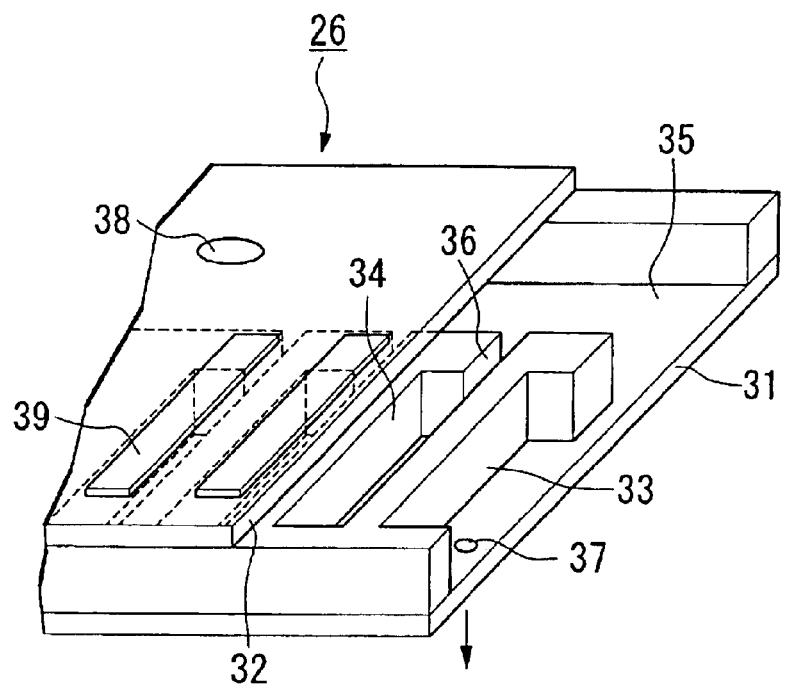
FIG. 16 is a perspective view of the arrangement of a head of a droplet discharge unit used in the process of placing spacers.
Figure 17:
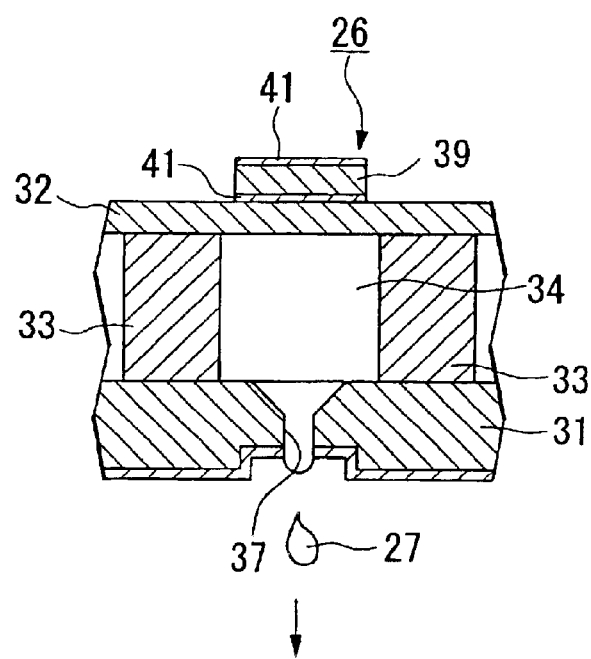
FIG. 17 is a cross-sectional view of the arrangement of the head of the droplet discharge unit.

FIGS. 16 and 17 show an example of the structure of a head 26 of the ink-jet unit used here. The ink-jet head 26 includes a nozzle plate 31 made of stainless steel or the like and a diaphragm 32, which are joined together through a partition member (reservoir plate) 33, as shown in FIG. 16. Between the nozzle plate 31 and the diaphragm 32, a plurality of spaces 34 and a fluid reservoir 35 are formed with the partition member 33. The spaces 34 and the fluid reservoir 35 are filled with a spacer dispersion liquid and are communicated with one another through a supply port 36. The nozzle plate 31 has nozzle holes 37 to emit a jet of the spacer dispersion liquid from the spaces 34. On the other hand, the diaphragm 32 has a hole 38 to supply the spacer dispersion liquid to the fluid reservoir 35.

As FIG. 17 shows, the surface of the diaphragm 32 opposite to the surface facing the spaces 34 has a piezoelectric element 39 joined thereto. The piezoelectric element 39 is located between a pair of electrodes 41 and is deflected toward the exterior when energized, and at the same time, the diaphragm 32 to which the piezoelectric element 39 is joined is also deflected together to the exterior. This increases the capacity of the spaces 34. Accordingly, the spacer dispersion liquid corresponding to the increased capacity flows from the fluid reservoir 35 into the spaces 34 through the supply port 36. When the energization to the piezoelectric element 39 is then cancelled, both of the piezoelectric element 39 and the diaphragm 32 return to the original shape. This also returns the spaces 34 to its initial capacity, thus increasing the pressure of the spacer dispersion liquid in the spaces 34, so that droplets 27 of the spacer dispersion liquid are discharged from the nozzle holes 37 toward the substrate.

Figure 18:
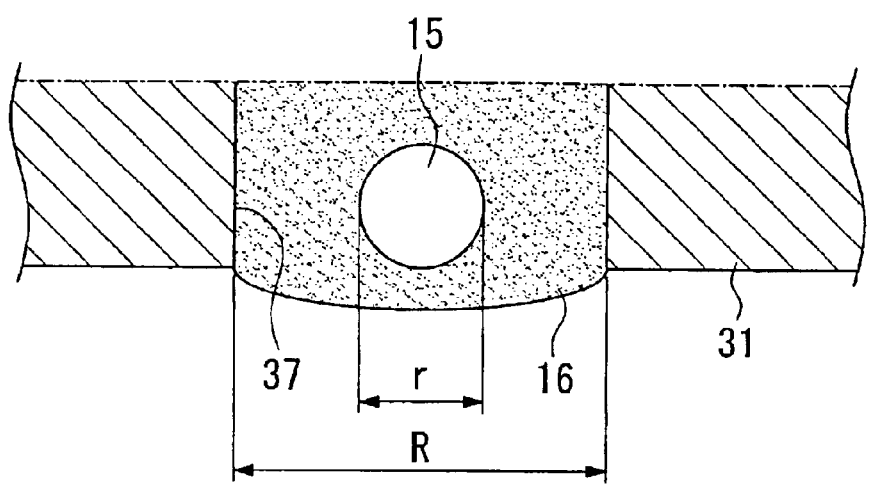
FIG. 18 is a cross-sectional view of a part of a nozzle hole of the head of the droplet discharge unit.

With this exemplary embodiment, as FIG. 18 shows, the diameter R of each nozzle hole 37 is set to at least 10 μm and at most 100 μm and to satisfy R>2r where r is the diameter of the spacer 15. This is because when the diameter R is smaller than 10 μm, a specific amount of a spacer dispersion liquid 16 (viscosity: 1 to 30 mPas) containing the spacers 15 cannot be discharged stably, causing variation in the amount of dropping itself and also the average number of spacers per dropped point. On the other hand, when the diameter R is larger than 100 μm, the droplets do not become complete circles but become a shape with a tail. The unstable shape increases the probability that the spacers 15 are not arranged in desired positions. When the diameter R is smaller than double the diameter r of the spacer 15, the probability that the spacers 15 clog the nozzle holes 37 increases to increase the variation in the number of the spacers 15 arranged in fixed points.

Although the exemplary embodiment has one piezoelectric element 39 and one space 34 for each nozzle, also it is expected that a head of the ink-jet unit having a plurality of nozzles for one piezoelectric element may offer the similar effects.

In step S5 of FIG. 13, the lower substrate 10 and the upper substrate 20 are bonded together and an optical film, such as a retardation film or a polarizer (not shown), is bonded to the outside of the lower substrate 10 and the upper substrate 20, so that the liquid crystal device having the cell structure of FIG. 3 is made.

Figure 14:
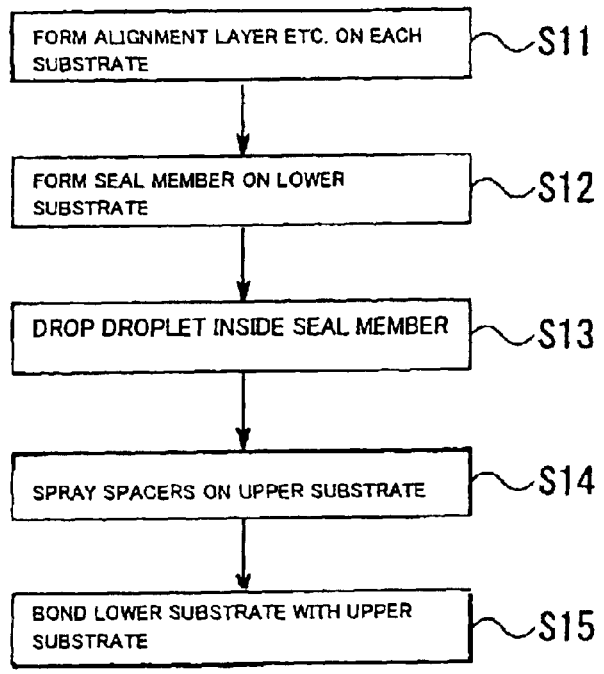
FIG. 14 is a flowchart for an exemplary modification of the manufacturing method.

On the other hand, another example of the method for manufacturing the liquid crystal device of the aforesaid exemplary embodiment includes the following process shown in FIG. 14. As in step S11 of FIG. 14, the alignment layer 40 and so on are formed on the lower substrate body 10A made of glass or the like to form the lower substrate (TFT array substrate) 10, in a manner similar to step S1 of FIG. 13. Also on the upper substrate body 20A, the alignment layer 60 and so on are formed to make the upper substrate (opposed substrate) 20.

In step 12 of FIG. 14, the closed-frame-shaped seal member 93 having no liquid crystal inlet is printed on the lower substrate (TFT array substrate) 10, as in the above. In step S13 of FIG. 14, a fixed amount of liquid crystal is then dropped inside the closed-frame-shaped seal member 93. Subsequently, in step S14 of FIG. 14, the spacers 15 are arranged on the upper substrate 20 with the ink-jet unit. Also in this case, the density of the spacers 15 in a spacer dispersion liquid to be prepared in the ink-jet unit is controlled so that there are the spacers 15 with a density of 50 to 300/mm² and an average of 0.2 to 3 per droplet.

In step S15 of FIG. 14, the lower substrate 10 and the upper substrate 20 are bonded together and an optical film, such as a retardation film or a polarizer, is bonded to the outside of the lower substrate 10 and the upper substrate 20, so that the liquid crystal device having the cell structure of FIG. 3 is made.

Exemplary Electronic Device

A specific example of an electronic device equipped with the liquid crystal device according to the exemplary embodiment is described below.

Figure 19A:
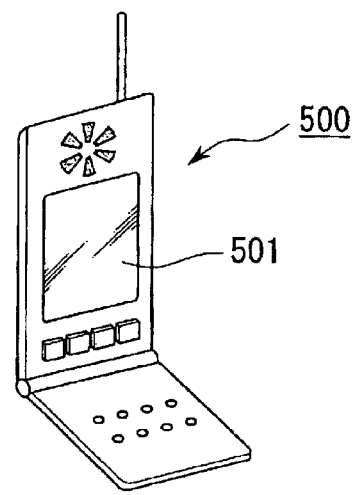
FIGS. 19A to 19C are perspective views of examples of an electronic device according to the invention.

FIG. 19A is a perspective view of an example of a cellular phone. In FIG. 19A, numeral 500 denotes a cellular phone body and numeral 501 indicates a liquid crystal display section having the liquid crystal device according to the exemplary embodiment.

Figure 19B:
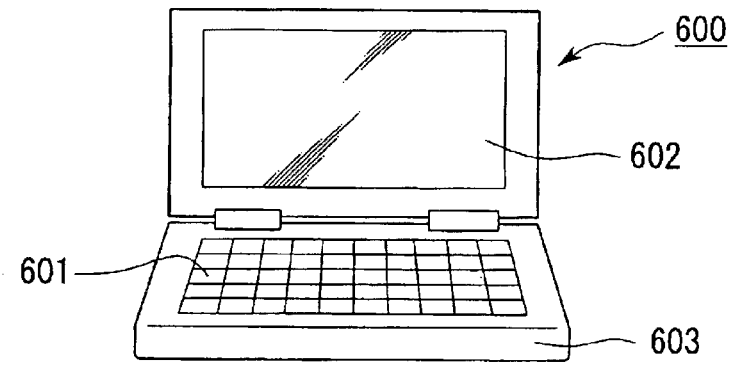

FIG. 19B is a perspective view of an example of a portable information processor, such as a word processor or a personal computer, for example. In FIG. 19B, numeral 600 denotes an information processor, numeral 601 indicates an input section, such as a keyboard, numeral 603 indicates an information processor body, and numeral 602 designates a liquid crystal display section having the liquid crystal device according to the exemplary embodiment.

Figure 19C:
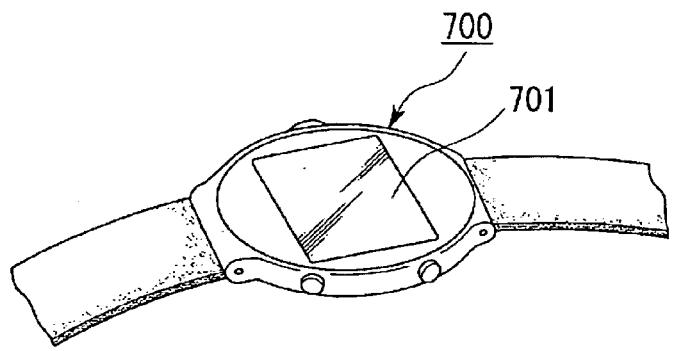

FIG. 19C is a perspective view of an example a wristwatch electronic device. In FIG. 19C, numeral 700 denotes a watch body and numeral 701 indicates a liquid crystal display section having the liquid crystal device according to the exemplary embodiment.

Since the electronic devices shown in FIGS. 19A to 19C include one of the liquid crystal devices according to the exemplary embodiments, they have a display section with an excellent display quality.

The scope of the technique of the invention is not limited to the aforesaid exemplary embodiment and various modifications may be made in the invention without departing from the scope of the invention. For example, although the exemplary embodiment takes an example of a manufacturing method in which a closed seal member having no liquid crystal inlet is provided, and after a liquid crystal has been dropped on one substrate, the other substrate is bonded thereto. In place of the structure, a method may be adopted in which a partly opened seal member having a liquid crystal inlet is provided, and after two substrates have been bonded together, a liquid crystal is injected by a vacuum injection method. Although the exemplary embodiment takes an active matrix transmissive liquid crystal device that uses a TFT element as an example of a liquid crystal device to be manufactured, it is to be understood that the invention is not limited to that and is obviously applied to various liquid crystal devices.

EXAMPLE 1

The inventors evaluated the characteristics of the liquid crystal device according to the invention. The evaluations are as follows:

A liquid crystal cell with a substrate of 400 mm×500 mm in size, substrate spacing of 6 μm, and different density of spacers was produced actually by the method of arranging spacers with the ink-jet unit, described in the above exemplary embodiment, and the evenness of substrate spacing and the presence of occurrence of cold bubbles were evaluated. The spacers were controlled so that an average number of spacers per droplet is two and the density of the spacers was varied to six variations of 10, 50, 100, 150, 300, and 400/mm². The evaluations are shown in Table 1.

In Table 1, for "the evenness of substrate spacing," mark ○ indicates one that exhibited no uneven display due to uneven cell thickness and mark x indicates one that exhibited uneven display by visual check. For "the presence of occurrence of cold bubbles," mark ○ exhibited no occurrence of bubbles and mark x indicates one that exhibited occurrence of bubbles by visual check.

TABLE 1

| Density of Spacers (/mm²) | Evenness of Substrate Spacing | Occurrence of Cold Bubbles |
| --- | --- | --- |
| 10 | X | ○ |
| 50 | ○ | ○ |
| 100 | ○ | ○ |
| 150 | ○ | ○ |
| 300 | ○ | ○ |
| 400 | ○ | X |

As clearly shown in Table 1, ones with a spacer density of 10/mm² caused uneven cell thickness and ones with a spacer density of 400/mm² caused cold bubbles, both of them were inferior in quality. On the other hand, we have observed that setting the density of the spacers within the range of 50 to 300/mm² will generate no uneven display due to uneven cell thickness, thus providing a liquid crystal cell that exhibits no occurrence of cold bubbles and is superior in display quality. The inventors have already confirmed that setting the density of the spacers within the range of 50 to 300/mm² can reduce the occurrence of display failure even by the related art spacer dispersing method without the ink-jet unit, which agrees also with the result of this experiment.

EXAMPLE 2

A liquid crystal cell with an average number of spacers per droplet different from that of Example 1 was actually produced using the liquid crystal cell as in Example 1, with the density of the spacers limited within the range of 50 to 300/mm², wherein the presence of deterioration in display quality due to uneven cell thickness and the presence of deterioration in display quality owing to light leakage due to a spacer aggregate and uneven cell thickness were evaluated. The average number of spacers per droplet was varied to seven variations of 0.08, 0.2, 0.5, 1, 3, 4, and 5. The results are shown in Table 2.

In Table 2, for the presence of deterioration in display quality due to uneven cell thickness, mark ○ indicates one that exhibited no deterioration in display quality due to uneven cell thickness because the number of spacers is too small, and mark x indicates one that exhibited uneven display by visual check. For the presence of deterioration in display quality owing to light leakage due to a spacer aggregate and uneven cell thickness, mark ○ indicates one that exhibited no deterioration in display quality owing to light leakage due to a spacer aggregate and uneven cell thickness, and mark x indicates one that exhibited deterioration in display quality by visual check. It can be determined whether the number of spacers is too small or large because when too few spacers exist, hazy unevenness is viewed and when too many spacers exist, luminous-dot-like light leakage due to aggregation of spacers is viewed.

TABLE 2

| Average Number of Spacers per Droplet | Deterioration in Display Quality Due to Uneven Cell Thickness | Deterioration in Display Quality Owing to Light Leakage Due to Spacer Aggregate and Uneven Cell Thickness |
| --- | --- | --- |
| 0.08 | X | ○ |
| 0.2 | ○ | ○ |
| 0.5 | ○ | ○ |
| 1 | ○ | ○ |
| 3 | ○ | ○ |
| 4 | ○ | X |
| 5 | ○ | X |

As clearly shown in Table 2, even when the average number of spacers per droplet is 0.08, among all points at which droplets were dropped by the ink-jet unit, the number of points that have no spacers is in excess of ninety percent, even if the condition of density of 50 to 300/mm² is satisfied. Such points are too large in number, thus resulting in deviation of the arrangement of spacers to cause uneven cell thickness. When the average number of spacers per droplet becomes larger than three, a giant spacer aggregate may increase in number to cause deterioration in display quality due to light leakage which may be apparently caused by the spacer aggregate and uneven cell thickness.

Table 3 shows the density of spacers (in the column) determined by the droplet spacing when a spacer dispersion liquid is dropped by the ink-jet unit (the vertical axis of the table, or the area on the substrate that has one droplet) and the average number of spacers per droplet (the horizontal axis of the table). For example, 40×40 in the vertical axis of Table 3 indicates that the droplet spacing in the X-axis scanning direction of the ink-jet unit is 40 μm and the droplet spacing in the Y-axis scanning direction is 40 μm. Setting to the combination of the droplet spacing and the average number of spacers per droplet within the range surrounded by a bold line in Table 3 will achieve the arrangement of spacers in the liquid crystal device according to the invention.

TABLE 3

| Droplet Spacing (μm) | Average Number of Spacers | | | | | | |
| --- | --- | --- | --- | --- | --- | --- | --- |
|  | 0.08 | 0.2 | 0.5 | 1 | 3 | 4 | 5 |
| 40 × 40 | 50 | 125 | 313 | 625 | 1875 | 2500 | 3125 |
| 50 × 50 | 32 | 80 | 200 | 400 | 1200 | 1600 | 2000 |
| 60 × 60 | 22 | 56 | 139 | 278 | 833 | 1112 | 1390 |
| 90 × 60 | 15 | 37 | 93 | 185 | 556 | 740 | 925 |
| 100 × 80 | 10 | 25 | 63 | 125 | 375 | 500 | 625 |
| 100 × 100 | 8 | 20 | 50 | 100 | 300 | 400 | 500 |
| 120 × 100 | 7 | 17 | 42 | 83 | 250 | 332 | 415 |

EXAMPLE 3

A liquid crystal cell with the diameter of a droplet discharge nozzle of the ink-jet unit different from that of Examples 1 and 2 was actually produced using the liquid crystal cell as in Examples 1 and 2, with the density of the spacers limited within 50 to 300/mm², the average number of spacers per droplet to two, and the diameter of spacers to 4 μm, where three items of the stability of the average number of spacers per point, the stability of the shape of droplets, and the stability of fluid volume per droplet were evaluated. The diameter of the nozzle's opening was varied to five variations of 6, 10, 30, 100, and 150 μm. The results are shown in Table 4.

In Table 4, for the stability of the average number of spacers per point, mark x indicates one that exhibited no stability at all and large variations in the number of spacers, mark Δ indicates one with slight variations in the number of spacers, and mark ○ indicates one that exhibits sufficient stability in the number of spacers by visual check. For the stability of the shape of droplets, mark x indicates one that exhibited a droplet with a tail in unstable shape, and mark ○ indicates one that provided a circle droplet with stability by visual check. For the stability of fluid volume per droplet, mark x indicates one that exhibited no stability of fluid volume at all due to clogging of the nozzles by visual check, and mark Δ indicates one that exhibited slight variation in fluid volume, and mark ○ indicates one with sufficiently stable fluid volume.

TABLE 4

|  | Diameter of Nozzle (μm) | | | | |
| --- | --- | --- | --- | --- | --- |
|  | 6 | 10 | 30 | 100 | 150 |
| Stability of Average Number of Spacers per point | X | ○ | ○ | Δ | Δ |
| Stability of Shape of Droplet | ○ | ○ | ○ | ○ | X |
| Stability of Fluid Volume per Droplet | X | ○ | ○ | Δ | Δ |

As clearly shown in Table 4, when the diameter of the nozzle's opening was set to 6 μm, the nozzle was clogged with the spacer of 4 μm in diameter, so that both of the fluid volume and the number of spacers were unstable. On the other hand, when the diameter of the nozzle's opening was set to 150 μm, the fluid volume itself was increased. Accordingly, both the fluid volume and the number of spacers were slightly unstable and many droplets had a shape with a tail, which were not stable at all. On the other hand, with the diameter of the nozzle's opening within the range of 10 to 100 μm, the three items of the liquid volume, the number of spacers, and the shape of droplets were almost stable. However, with the diameter of the nozzle's opening at 100 μm, both the fluid volume and the number of spacers were slightly varied and with the diameter of the nozzle's opening at 10 μm and 30 μm, they were completely stable.

In summary, the results of Examples 1 and 2 show that both the display failure due to too few spacers and the display failure due to too many spacers can be reduced and in order to maintain a good display quality, it is preferable to set the density of the spacers from 50 to 300/mm² and to set the average number of spacers per droplet from 0.2 to 3. Furthermore, the result of Example 3 shows that in order to realize the arrangement of the spacers with stability, it is preferable to set the diameter of the nozzle's opening of the ink-jet unit to be used within the range of 10 to 100 μm (more preferably, 10 to 30 μm).

What is claimed is:

1. A liquid crystal device, comprising:

a seal member;

spacers;

a pair of substrates opposed to each other through the seal member defining a sealed space; and a liquid crystal, the liquid crystal and the spacers being contained in the sealed space enclosed with the pair of substrates and the seal member;

the spacers being placed on at least a part of intersection points of a plurality of first parallel phantom lines extending in a first direction and a plurality of second parallel phantom lines extending in a second direction different from the first direction with the spacers arranged separately, in aggregation, or in mixture thereof; and the density of spacers being from 50 to 300/mm², and an average number of spacers on all the intersection points being from 0.2 to 3.

2. The liquid crystal device according to claim 1, the spacers being placed in a non-pixel region.

3. The liquid crystal device according to claim 2, further comprising:

a light-shielding layer corresponding to the non-pixel region.

4. The liquid crystal device according to claim 1, the spacers being colored.

5. The liquid crystal device according to claim 1, the surfaces of the spacers being subjected to a process of controlling the orientation of the liquid crystal.

6. The liquid crystal device according to claim 1, the surfaces of the spacers including a bonding layer to bond the spacers themselves onto the substrates.

7. An electronic device, comprising:

the liquid crystal device according to claim 1.

8. A method for manufacturing a liquid crystal device in which a pair of substrates is opposed to each other through a seal member and a liquid crystal and spacers are contained in a sealed space enclosed with the pair of substrates and the seal member, the method comprising:

dropping a spacer dispersion liquid having the spacers dispersed in a predetermined solvent in certain positions on one of the pair of substrates with a droplet discharge unit; and placing the spacers by evaporating the solvent in droplets dropped on the substrate so as to arrange the spacers on at least a part of the intersection points of a plurality of first parallel phantom lines extending in a first direction and a plurality of second parallel phantom lines extending in a second direction different from the first direction, with the spacers arranged separately, in aggregation, or in mixture thereof, the density of spacers being from 50 to 300/mm², and an average number of spacers on all the intersection points being from 0.2 to 3.

9. The method for manufacturing the liquid crystal device according to claim 8, the first direction in which the first phantom lines extend being the direction of arrangement of a plurality of droplet discharge nozzles of the droplet discharge unit; and the second direction in which the second phantom lines extend being the scanning direction of the plurality of droplet discharge nozzles of the droplet discharge unit.

10. The method for manufacturing the liquid crystal device according to claim 8, the diameter of the droplet discharge nozzles of the droplet discharge unit being at least 10 μm and at most 100 μm.

11. The method for manufacturing the liquid crystal device according to claim 10, the diameter of the droplet discharge nozzle's opening being at least 10 μm and at most 30 μm.

12. The method for manufacturing the liquid crystal device according to claim 8, the diameter of the droplet discharge nozzle's opening being at least twice as large as that of the spacers.

13. The method for manufacturing the liquid crystal device according to claim 8, the method further comprising:

forming a closed-frame-shaped seal member in the region in the surface of one of the pair of substrates;

dropping the liquid crystal in the region enclosed with the seal member on the substrate having the seal member; and bonding the substrate having the seal member and the other substrate.

14. The method for manufacturing the liquid crystal device according to claim 8, the dropping of the spacer dispersion liquid on the substrate including dropping the droplet at a spacing larger than the diameter of the droplet dropped on the substrate.

* * * * *